United States Patent [19]

Blais

[11] Patent Number: 4,542,724
[45] Date of Patent: Sep. 24, 1985

[54] FLAME INJECTOR FOR INTERNAL COMBUSTION ENGINES

[76] Inventor: Gordon A. Blais, P.O. Box 1586, Cupertino, Calif. 95015

[21] Appl. No.: 421,408

[22] Filed: Sep. 22, 1982

[51] Int. Cl.³ .............................................. F02B 19/10
[52] U.S. Cl. .............................. 123/266; 123/169 PA; 123/293
[58] Field of Search ............. 123/143 B, 169 PA, 270, 123/271, 286, 293, 266, 267, 268

[56] References Cited

U.S. PATENT DOCUMENTS

| 935,931 | 10/1909 | Sharp | 123/266 |
|---|---|---|---|
| 1,929,748 | 10/1933 | Little | 123/169 PA |
| 2,100,320 | 11/1937 | Browning . | |
| 2,127,512 | 8/1938 | Harper, Jr. | 123/169 PA |
| 2,677,356 | 5/1954 | Pielstick | 123/266 |
| 2,969,050 | 1/1961 | Greier et al. | 123/270 |
| 3,066,662 | 12/1962 | May et al. | 123/253 X |
| 4,256,071 | 3/1981 | Casull | 123/266 |

Primary Examiner—Tony M. Argenbright

[57] ABSTRACT

A combustion aid for internal combustion engines featuring a sleeve having a forward end relative to a combustion chamber with a frusto-conical interior surface. A plurality of circumferentially spaced passages in an annular zone so that the passages are angled inwardly and rearwardly to promote gas swirling. The sleeve is adapted to receive a spark plug and distribute the flame from the spark uniformly into a combustion chamber of an internal combustion engine.

5 Claims, 3 Drawing Figures

FLAME INJECTOR FOR INTERNAL COMBUSTION ENGINES

DESCRIPTION

1. Technical Field

The invention relates to apparatus for aiding combustion in an internal combustion engine and more particularly to apparatus for providing a more uniform flame in internal combustion engines.

2. Background Art

One of the problems encountered in internal combustion engine technology is the non-uniformity of the flame in the combustion chamber. This non-uniformity usually arises because of unevenness of fuel distribution and the necessity of a flame front to propagate from a spark point outwardly to the combustion chamber walls. Other irregularities in the combustion chamber, such as unevenness in the size of fuel particles may exacerbate the situation.

Previously, others have recognized the deficiencies in the conventional approach of providing a spark plug near the combustion chamber wall and have attempted to provide auxiliary combustion chambers or modified spark plugs. For example, U.S. Pat. No. 2,100,320 to Browning shows a modified spark plug with apertures for distributing spark portions. U.S. Pat. No. 2,677,356 to Pielstick shows a pre-combustion chamber nozzle featuring plural exit apertures for a spark.

While the spark plug holders and auxiliary combustion chambers of the prior art have had some success in meeting their intended goals, recently enacted pollution legislation has called for even greater efficiency in minimizing the effects of combustion chamber non-uniformities.

An object of the present invention was to devise an aid for internal combustion engines which would uniformly distribute the spark flame front in a manner which minimized pollutants, while enhancing power and thermodynamic efficiency, without sacrificing fuel economy.

DISCLOSURE OF INVENTION

The above object has been met with a device for use in internal combustion engines having spark plug receiving chambers. The device seats a spark plug and provides for high efficiency distribution of a flame front toward combustion chamber walls. This effect is achieved by providing swirling of pre-combustion gas consisting of a fuel-air mixture. This swirling tends to cause separation of atmosphere-carrier particles from heavier fuel particles, with the intended effect that richer mixture will be present in the area of spark initiation, only when venting of lighter particles can occur at the center passage of the device. Such venting occurs by negative pressure created by horizontal gas flow over that passage on engine intake and exhaust strokes. Upon combustion a flame front is created due to the flame emerging from circumferentially spaced side passages and the center passage. The exhaust stroke effectively scavenges particles, providing a clean spark chamber for the intake stroke.

BEST MODE FOR CARRYING OUT THE INVENTION

Figure 1:
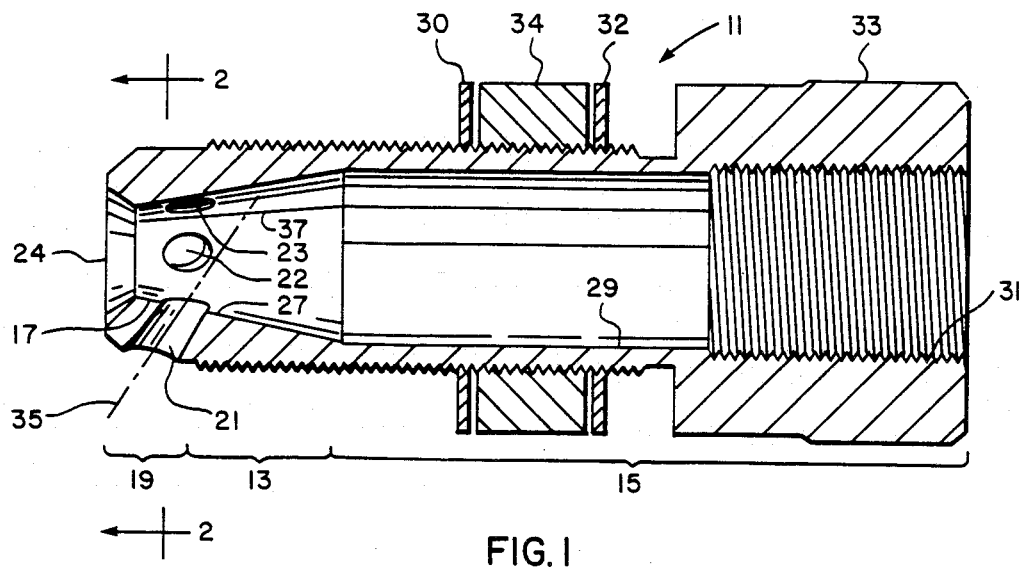
FIG. 1 is a side cutaway view of the apparatus of the present invention.

With reference to FIG. 1, spark chamber 11 has an axial forward portion designated by bracket 13 and an axial rearward portion designated by bracket 15. The overall length of the chamber is approximately $1\frac{1}{2}$ inches, although this dimension is not critical. Forward portion 13 has a forward end 17 and an annular perforated region 19 which joins forward end 17 to forward portion 13. This is a blend zone which allows the forward end to be smoothly joined to the chamber body.

The annular perforated region 19 includes a plurality of holes 21, 22, 23 which are passages tapered upwardly at a 25° clockwise angle and angled inwardly at a 30° angle relative to the exterior wall surface as viewed from the inward end, providing flame communication from the interior of the chamber to the exterior. The inner surface 27 of cylindrical sleeve 11 resembles the surface of the frustum of a cone with a maximum diameter toward the rearward portion of the sleeve and a minimum diameter towards end 17. The frusto-conical inner surface, having a 12.5° wall slope, serves to promote a swirling effect of the air-fuel mixture in relation to the passages, as explained below with reference to FIG. 2. Another passage, 24, is provided in the axial center of end 17. This passage is the same size as passages 21, 22, 23, but has a rim beveled at 60°, with a width of 0.04685 inches.

The preferred number of passages is five because there is sufficient separation between adjacent passages for good flame injection into an engine combustion chamber, without much overlap. Six passages could also be provided, but beyond six, heat buildup from adjacent passages tends to become too great and the passages would tend to merge into each other. On the other hand, fewer than five passages may not yield sufficient flame coverage over the interior of an engine combustion chamber. The spark chamber should be made of a unitary, heat resistant material, such as stainless steel.

The diameter of the passages, including passage 24, is approximately 0.1875 inches with symmetric circumferential spacing of approximately 72° between passages in annular region 19 for five passages.

Rearward portion 15 of the cylindrical sleeve features an inner bore 29 which is generally uniform with respect to the sleeve axis between the maximum diameter of the frusto-conical inner surface rearwardly to a thread zone. The most rearward half inch of the inner bore has a thread pattern 31 suitable for engaging threads of a spark plug to be seated therein. The outer surface of the cylindrical sleeve has an enlarged outer surface portion 33 adapted to be held by a wrench while an intermediate outer surface region 35 has a thread pattern adapted to be seated in a spark plug receiving chamber of an internal combustion engine. A spacer is provided externally of sleeve 11 including star lock washers 30, 32 and a spacer member 34, such as a soft metal gasket. The spacer is not used where long-reach plugs are required. The spark chamber protrudes about 0.290 inches into a combustion chamber, indicated by distance 19.

Figure 2:
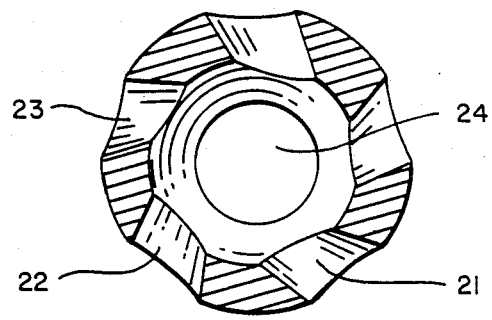
FIG. 2 is a cross section view of the apparatus of FIG. 1 taken along lines 2—2 in FIG. 1.

With reference to FIG. 2, the angling of the circumferential passages may be more clearly seen. Each of the passages 21, 22, 23, and so on is drilled angularly inwardly and rearwardly. Recalling that the inner forward surface is frusto-conical in shape, the angle of the passages is cut such that the passage axis makes a very small angle with the sloped inner wall near the maximum diameter of the inner surface, i.e., tangent to the inner surface, in order to promote smooth swirling of the fuel-air mixture flowing into the sleeve during the pre-combustion period. Referring momentarily to FIG. 1, it will be seen that the dashed line 35, along the axis of passage 21 makes contact with an opposed inner surface wall at point 37 near the maximum diameter of the frusto-conical surface.

Returning to FIG. 2, it is seen that the radial inclination of the passages 21, 22, 23, and so on resembles a pin wheel in top view. In three dimensions, the intended gas trajectory consists of a helical pattern which would promote gas swirling. In this helical pattern, heavier particles in the fuel-air mixture are forced outwardly by centrifugal force, while atmospheric carrier particles are less affected and tend to remain near the axial center line of the spark chamber where negative pressure at the center hole draws unladen carrier particles from the spark chamber. The concentration of fuel in the spark chamber is greater than in the main combustion chamber due to the exhaust of carrier from the spark chamber. Upon ignition a flame front can propagate very rapidly down the center line of the chamber, then outwardly through the passages.

Figure 3:
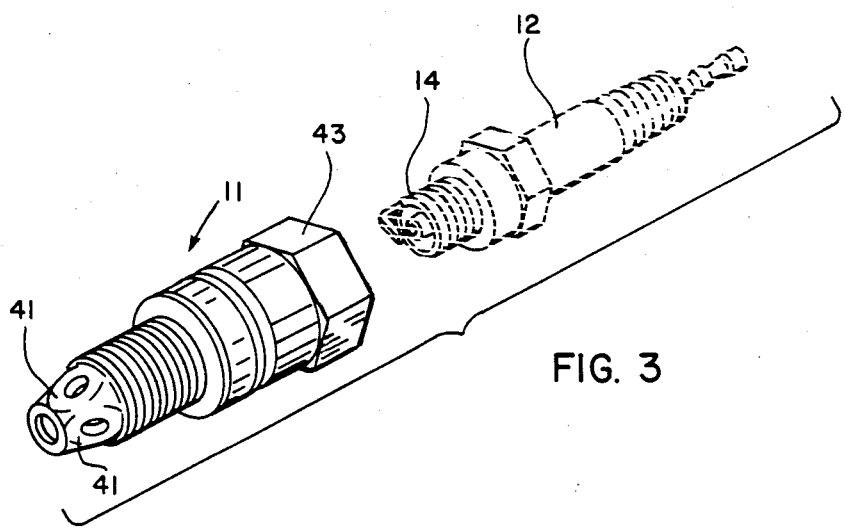
FIG. 3 is a perspective view of the apparatus of FIG. 1. shown in relation to a spark plug to be held therein.

With reference to FIG. 3, a spark plug 12 having threads 14 is seen in an exploded view with reference to the cylindrical sleeve 11. An internal combustion engine of conventional design may have all of its spark plugs removed and replaced by the spark chambers of the present invention. The plugs are then seated in the spark chamber except that engine timing should be advanced to account for propagation time of the flame front in passing through the chamber and into the engine main combustion chamber. An enlarged polygonal surface 43 is provided for gripping by wrenches.

It may be seen that the perforated region where the holes reside has a plurality of sculpted pockets 41, one for each passage. These sculpted pockets are intended to funnel the air-fuel mixture into the passages on the one hand and on the other hand to remove spark chamber material from the vicinity of the exterior of the passage to limit erosion by the flame ejected from the passages.

I claim:
1. A spark chamber for a spark plug comprising,
a cylindrical sleeve having axial forward and rearward portions, an inner bore and an outer surface, the axial forward portion having a forward end joined thereto by an annular perforated region, the perforated region having a plurality of symmetrically spaced passages tapered inwardly at an angle in a pinwheel manner and rearwardly, the forward portion of the sleeve having a frusto-conical inner surface at a small angle for swirling gas flow in relation thereto, the forwardmost region defining an axial aperture capable of negative pressure communication with said symmetrically spaced passages for drawing gas into the sleeve, the rearward inner bore portion of the sleeve having a thread pattern adapted to seat a spark plug, an outer surface portion of the sleeve intermediate the forward and rearward having a thread pattern adapted to be seated in a spark plug receiving chamber of an engine the spark plug having electrodes located rearwardly of said annular perforated region.
2. The spark chamber of claim 1 wherein the number of symmetrically spaced passages is five.
3. The spark chamber of claim 1 wherein the number of symmetrically spaced passages is six.
4. The apparatus of claim 1 wherein the exterior surface of said annular perforated region is sculpted with a sculpted pocket for each passage.
5. A spark chamber for a spark plug comprising,
a cylindrical, unitary sleeve member having an axis, an open, internally threaded end for receiving a spark plug and a distal end defining a plurality of passages including a single passage defined along the cylindrical member axis and a plurality of circumferentially spaced passages defined in a laterally facing annular region adjacent to the closed end, the spaced passages tapered inwardly at an angle providing ingress and egress between the exterior and interior walls of the member, capable of negative pressure communication with said single axial passage for drawing gas into the sleeve, the interior walls of the chamber adjacent the distal end having a frusto-conical slope, with a narrow conical dimension toward said end, the exterior wall of the member having a thread pattern adapted to be seated in a spark plug receiving chamber of an engine, the spark plug having electrodes located between said threaded end and said distal end.

* * * * *